US007411970B2

(12) United States Patent
Scott et al.

(10) Patent No.: US 7,411,970 B2
(45) Date of Patent: Aug. 12, 2008

(54) ADAPTIVE CLOCK RECOVERY

(75) Inventors: Martin Raymond Scott, Perranporth (GB); Nicholas Faithorn, Tavistock (GB); Timothy Michael Edmund Frost, Plymouth (GB)

(73) Assignee: Zarlink Semiconductor Limited, Wiltshire (GB)

( * ) Notice: Subject to any disclaimer, the term of this patent is extended or adjusted under 35 U.S.C. 154(b) by 938 days.

(21) Appl. No.: 10/646,087

(22) Filed: Aug. 22, 2003

(65) Prior Publication Data

US 2005/0100054 A1 May 12, 2005

(30) Foreign Application Priority Data

Aug. 24, 2002 (GB) ................................ 0219786.1

(51) Int. Cl.
*H04L 12/56* (2006.01)
*H04B 7/212* (2006.01)

(52) U.S. Cl. ................... 370/419; 370/412; 370/395.62

(58) Field of Classification Search ................. 370/412, 370/395.62, 516, 252, 503, 468, 356, 419; 375/376

See application file for complete search history.

(56) References Cited

U.S. PATENT DOCUMENTS 5,260,978 A 11/1993 Fleisher et al.
5,526,362 A 6/1996 Thompson et al. .......... 370/516
5,640,388 A 6/1997 Woodhead et al. .......... 370/468
5,970,107 A 10/1999 Bleiweiss et al. ...... 370/395.62
6,144,714 A 11/2000 Bleiweiss et al. ........... 375/376
2003/0152094 A1* 8/2003 Colavito et al. ............. 370/412
2005/0190797 A1* 9/2005 Elliot ......................... 370/503
2006/0050689 A1* 3/2006 Rabenko et al. ............. 370/356

FOREIGN PATENT DOCUMENTS

EP 0624983 A2 11/1994
WO WO 96/31028 A 10/1996
WO WO 00/38353 A1 6/2000
WO WO 01/37468 A2 5/2001

OTHER PUBLICATIONS

Patents Act 1977: Search Report under Section 17(5) for United Kingdom Counterpart Application No. GB 0219786.1 (Feb. 12, 2003).

(Continued)

*Primary Examiner*—John Pezzlo
(74) *Attorney, Agent, or Firm*—Blakely, Sokoloff, Taylor & Zafman LLP

(57) ABSTRACT

A method of recovering a clock signal for a TDM output from packets of TDM data which have been transmitted over a packet network, from a source having a source TDM clock to a destination having a destination TDM clock. The method includes providing at least some packets with a Remote Time stamp representing the state of the source TDM clock when the packet is created; providing said at least some packets with a Local Timestamp representing the state of the destination TDM clock when the packet is received; determining a Transit Time value representing the difference between said Local and Remote Timestamps; and controlling the clock frequency of the TDM output on the basis of said Transit Time as determined above.

17 Claims, 2 Drawing Sheets

OTHER PUBLICATIONS

The ATM Forum Technical Committee, "Circuit Emulation Service Interoperability Specification, Version 2.0," ATM Forum document No. af-vtoa-0078.000, Jan. 1997.

International Telecommunication Union (ITU). ITU-T, I.363.1. Series I: Integrated Services Digital Network: Overall Network aspects and functions—Protocol layer requirements, B-ISDN ATM Adaptation Layer specification Type 1 AAL. (Aug. 1996).

Lau, R.C., et al., "Synchronous Techniques for Timing Recovery in BISDN" Communication for Global Users, Including a Communications Theory Mini Conference. Orlando, Fla., Dec. 6-9, 1992, Proceedings of the Global Telecommunications Conference (GLOBECOM), New York, IEEE, US, pp. 814-820, XP010062613 ISBN 0780306082.

European Search Report for Application No. EP 03102600 dated Jun. 21, 2005, 3 pages, European Patent Office.

* cited by examiner

ADAPTIVE CLOCK RECOVERY

FIELD

The invention relates to the recovery of clock signals for a TDM output from packets of TDM data which have been transmitted over a packet network.

BACKGROUND

TDM links are synchronous circuits, with a constant bit rate governed by the service clock $f_{service}$. With a packet network the connection between the ingress and egress frequency is broken, since packets are discontinuous in time. From FIG. 1, the TDM service frequency $f_{service}$ at the customer premises must be exactly reproduced at the egress of the packet network ($f_{regen}$). The consequence of a long-term mismatch in frequency is that the queue at the egress of the packet network will either fill up or empty, depending on whether the regenerated clock is slower or faster than the original. This will cause loss of data and degradation of the service.

The relevant standards on circuit emulation services over ATM, ITU standard I.363.1 and ATM Forum standard af-vtoa-0078 refer to the concept of adaptive clock recovery in general terms.

SUMMARY OF THE INVENTION

According to the invention there is provided a method of recovering a clock signal, and a clock recovery system, as set out in the accompanying claims.

BRIEF DESCRIPTION OF THE DRAWINGS

Embodiments of the invention will now be more particularly described, by way of example only, with reference to the accompanying drawings, in which.

DETAILED DESCRIPTION

Figure 1:
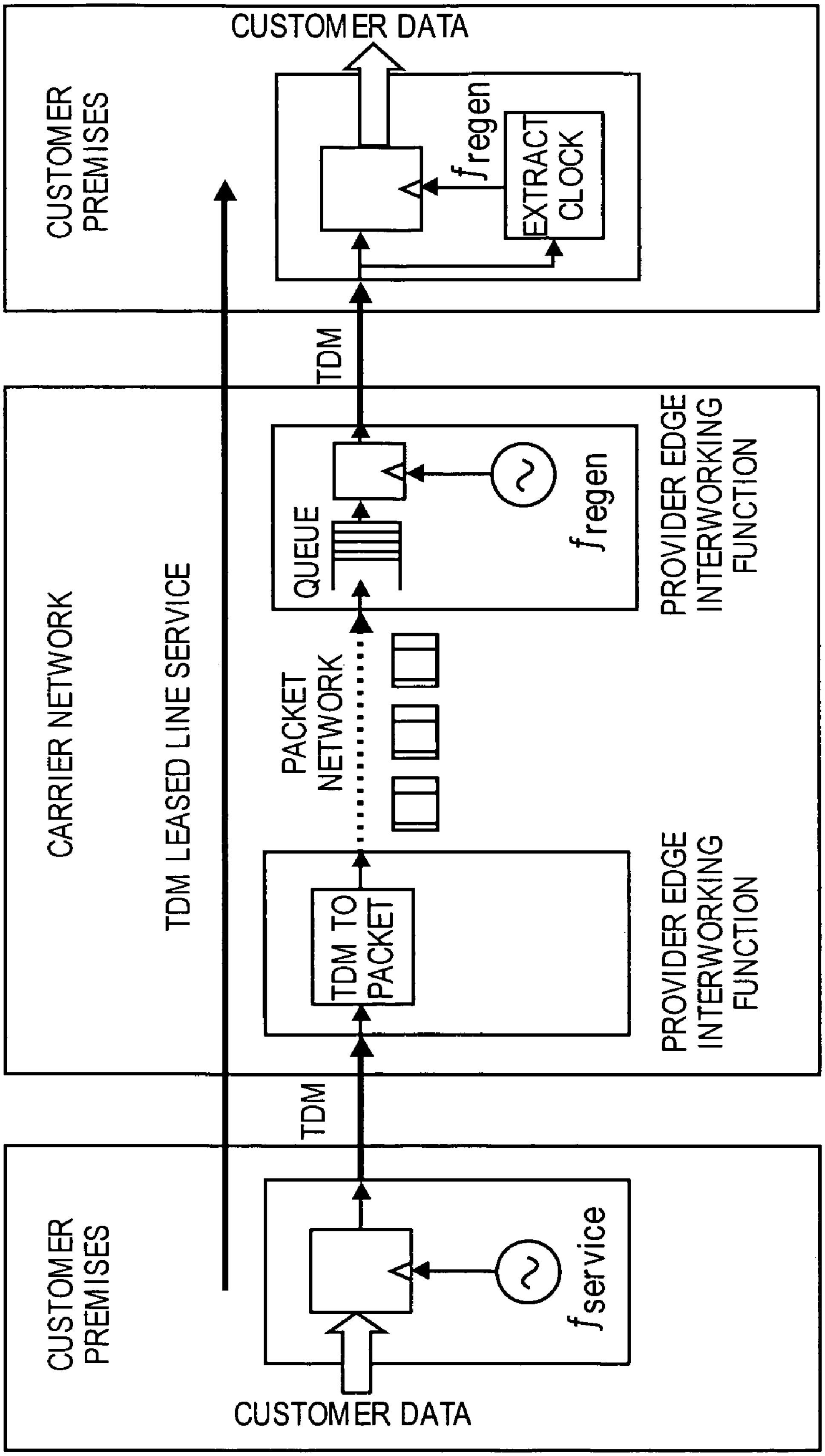
FIG. 1 is a schematic diagram showing a leased line TDM service being carried across a packet network.

In FIG. 1, the rate of transmission of packets from the source device is isochronous and determined by $f_{service}$. However, the rate of packet arrival at the destination device is perturbed by the intervening packet network. Packets will typically arrive in bursts separated by varying amounts of delay. The delay between successive packets and bursts will vary depending on the amount of traffic in the network. The characteristics of the network are non-deterministic, but over the long term the rate of arrival at the destination will equal the rate of departure at the source (assuming no lost or duplicate packets).

Figure 2:
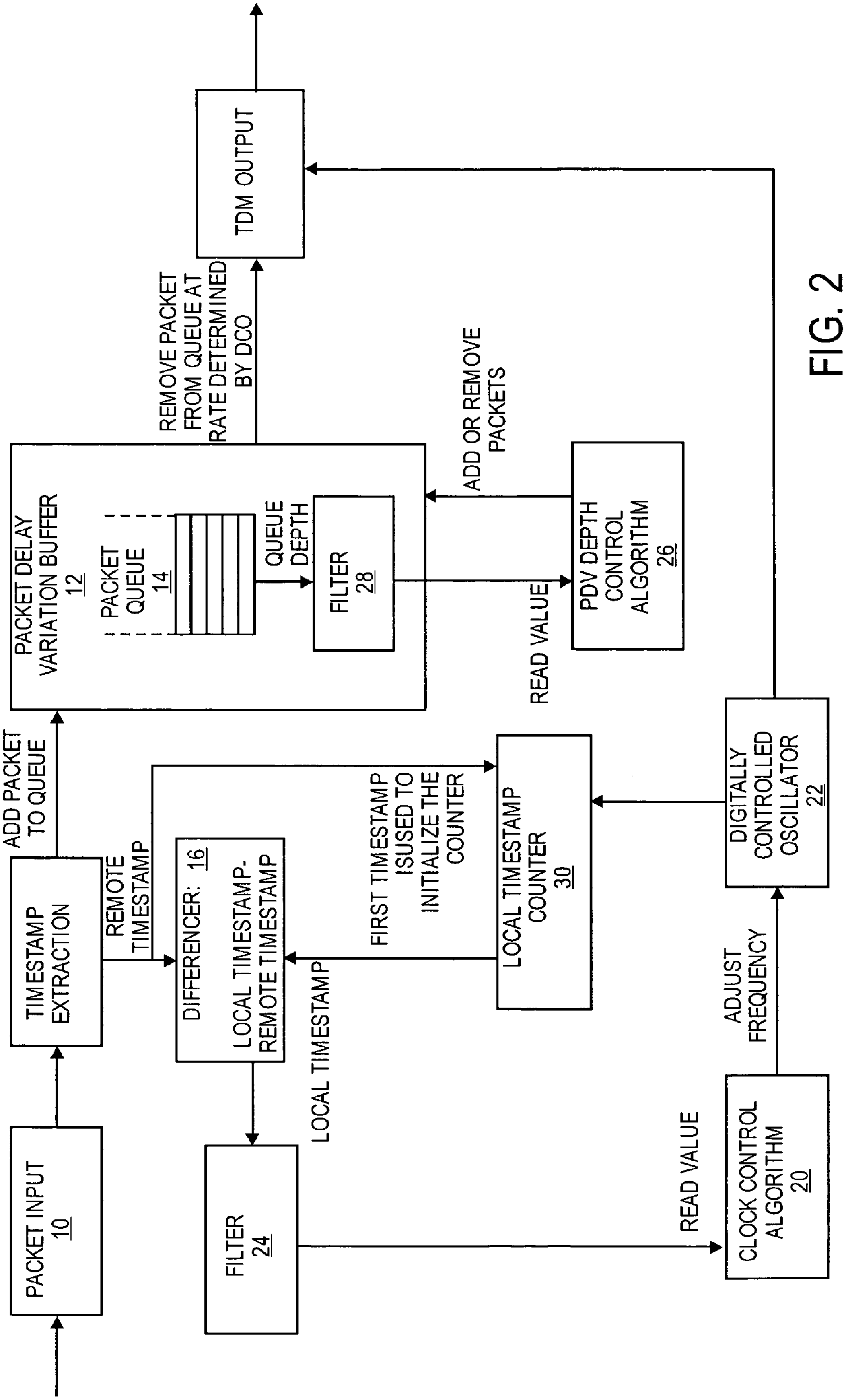
FIG. 2 is a schematic diagram showing a clock recovery method based on Transit Time in accordance with an embodiment of the invention.

The TDM output at the destination is isochronous and determined by $f_{regen}$. This is provided by the Digitally Controlled Oscillator (DCO) (22) in FIG. 2. The output is supplied from a Packet Delay Variation (PDV) Buffer (12). If the buffer has zero packets in it when the TDM output requires to transmit then an underrun will occur, which is undesirable. In order to minimise underrun events it is necessary to build up the PDV buffer (12) so that it contains sufficient packets to supply the TDM output (15) for the majority of inter packet delays. However, the PDV buffer (12) cannot be made arbitrarily large because this directly increases the end to end latency which, in general, is required to be as low as possible, the maximum tolerable latency being dependent on the application. For example, voice requires lower latency than data.

Thus the optimal PDV Buffer depth depends upon network conditions and application. The clock recovery method described here allows the buffer depth to be varied independently of the clock recovery mechanism. This allows the clock recovery to stabilise prior to setting up the PDV Buffer, and allows the buffer to be changed during operation to match any underlying shift in network characteristics.

When a packet arrives at the Packet Input (10) it is placed into a PDV Buffer (12) in a Queue (14). It also has its timestamp extracted (11) and passed to a Differencer (16). The Remote timestamp is determined at the source device when the packet is created, by counting periods of the source TDM clock $f_{service}$ shown in FIG. 1. The Local Timestamp is determined, when the packet is received, by counting periods of the local TDM clock $f_{regen}$ also shown in FIG. 1.

The Differencer (16) subtracts the Remote Timestamp from the Local Timestamp to obtain the Transit Time.

$$\text{Transit Time}(n)=\text{Local Timestamp}(n)-\text{Remote Timestamp}(n) \qquad \text{Equation (1)}$$

It should be noted that because the Local and Remote clock frequencies and initial counts are not initially synchronised with respect to each other, the quantity "Transit Time" in Equation 1 does not represent the actual time that the packet has taken to travel between the source and destination but is instead a measure of the difference between counts of the bit clock cycles of the two clocks.

Hence, given an ideal fixed delay packet network, the Transit Time value will decrease if $f_{service}$ exceeds $f_{regen}$, will increase if $f_{regen}$ exceeds $f_{service}$, and will remain constant if the frequencies are identical. In one embodiment of the invention, the counter 30 used to determine the local timestamp is initialised to the first received value of the remote timestamp, setting the initial value of transit time to zero.

For each received packet (assuming no lost packets), the Remote Timestamp will increase by a fixed amount which represents the number of bit clock cycles at the source that have elapsed since the previous packet i.e. the number of bits contained in the packet payload.

This system is robust in the presence of lost packets because the remote and local timestamps of the next packet received following the lost packet(s) are unaffected by the loss. The lost packets merely represent a short term loss of resolution in the measurement. In a typical system there will be thousands of packets per second so that a packet loss rate which is at the maximum likely to occur (i.e. a few percent) will have a negligible effect on the algorithm.

The Timestamps are counts (rather than actual times) that can be thought of as the phase of the clock.

So Equation (1) above can be represented as:

$$\Phi(n)=\theta_2(n)-\theta_1(n)$$

Where:

$\Phi(n)$ is the Transit Time $\theta_2$ is the phase of the Local Clock in bit periods $\theta_1$ is the phase of the Remote Clock in bit periods An indication of the frequency difference, can be obtained:

$$\begin{aligned}\Delta\Phi(n) &= \Phi(n)-\Phi(n-1)\\ &= [\theta_2(n)-\theta_1(n)]-[\theta_2(n-1)-\theta_1(n-1)]\end{aligned}$$

-continued $$= [\theta_2(n) - \theta_2(n-1)] - [\theta_1(n) - \theta_1(n-1)]$$
$$= [f_2(n) - f_1(n)] \cdot \Delta t$$
$$= \Delta f \cdot \Delta t$$

Where $\Delta t$ is the interval between packet arrivals.

f1 is the Remote clock frequency f2 is the Local clock frequency $\Delta f$ is the difference between the local and remote clock frequencies $\Delta f$ may be used by a Clock Control Algorithm (20) to adjust the Local Clock frequency.

With a real network the Transit Time, $\Phi(n)$, fluctuates due to the burst nature of the incoming packet stream. This causes fluctuations in the recovered clock. Therefore a filter function (24) is provided, which provides the following benefits:

reduces the workload of the Clock Control Algorithm (20) (which may be implemented by an external CPU) in terms of numerical processing reduces the workload of the Clock Control Algorithm (20) by allowing the Clock Control Interval to be increased reduces fluctuations in the recovered clock For example, the filter (24) may be a first order low pass filter with the following difference equation that is simple to implement in hardware without requiring any dividers or multipliers:

$$\Phi_{av}(n)=\Phi_{av}(n-1)+(\Phi(n)-\Phi_{av}(n-1))/2^P \quad \text{Equation (2)}$$

Where:

$\Phi_{av}$ is the Filter Output $\Phi$ is the Difference value

P is a programmable parameter that determines the time constant of the filter n is the sample number that increments each time that a packet is received at the Packet Input The Clock Control Algorithm (20) can read $\Phi_{av}$ at a fixed interval, to obtain $$\Delta\Phi_{av}(m)=\Phi_{av}(m)-\Phi_{av}(m-1)$$

It can be shown that $$\Phi_{av}(m)=\theta_{2\ av}(m)-\theta_{1\ av}(m)$$

Where $\theta_{2\ av}(m)$ and $\theta_{1\ av}(m)$ are also obtained by the filtering as described by Equation (2)

Therefore $$\Delta\Phi_{av}(m) = [\theta_{2av}(m) - \theta_{2av}(m-1)] - [\theta_{1av}(m) - \theta_{1av}(m-1)]$$
$$\Delta\Phi_{av}(m) = [f_2(m) - f_1(m-1)] \cdot \Delta t$$
$$= \Delta f \cdot \Delta t$$

Where $\Delta t$ is the interval between samples (m) and (m−1).

f1 is the Remote clock frequency f2 is the Local clock frequency $\Delta f$ is the difference between the local and remote clock frequencies The Clock Control Algorithm (20) will read $\Phi_{av}$ and determine the correction required to converge the Local clock to the Remote clock, and write the required Frequency to a DCO (22).

A simple first order Clock Control Algorithm is given by the following difference equation:

$$F(m)=F(m-1)+\beta(\Delta\Phi_{av}(m)/\Delta t)$$

Where:

F(m) is the Frequency to be written to the DCO;

F(m−1) is the Current DCO Frequency;

$\beta$ is a constant that determines a time constant;

$\Delta\Phi_{av}(m)$ is the change in the average transit time;

m is the sample number that increments each time the Clock Control Algorithm reads the value of $\Delta\Phi_{av}$; and $\Delta t$ is the time interval between reads of values by the Clock Control Algorithm.

The effect of this Clock Control Algorithm is to limit the frequency difference between the remote and local clocks, by correcting the DCO frequency in response a change in the filtered value of transit time, $\Delta\Phi_{av}(m)$. The constant term $\beta$ determines the time constant of this correction. It is selected to track long term drift in the remote clock frequency, $f_{service}$, but reject short term variation due to packet delay variations.

An enhanced Clock Control Algorithm is given by the following equation:

$$F(m)=F(m-1)+\beta(\Delta\Phi_{av}(m)/\Delta t)+\gamma((\Phi_{av}(m)-K)/\Delta t)$$

Where:

F(m) is the Frequency to be written to the DCO;

F(m−1) is the Current DCO Frequency;

$\Delta\Phi_{av}(m)$ is the change in the average transit time;

m is the sample number that increments each time the Clock Control Algorithm reads the value of $\Delta\Phi_{av}$;

$\beta$ and $\gamma$ are constants that determine time constants of the algorithm;

K is a constant that provides a "centre value" for the filtered transit time, $\Phi_{av}(m)$; and $\Delta t$ is the time interval between reads of values by the Clock Control Algorithm.

The difference between this equation and the simple Clock Control Algorithm is the addition of the term $\gamma((\Phi_{av}(m)-K)/\Delta t)$. This term tends to keep the filtered value of the transit time $\Phi_{av}(m)$ to a centre value K, by correcting the DCO frequency when $\Phi_{av}(m)$ drifts away from the centre value. This has the effect of controlling phase shift between the remote and local clocks. Since the initial value of transit time $\Phi(1)$ is normally set to zero, the value of K used is also normally set to zero.

The constant term $\gamma$ determines the time constant of this correction. As with the $\beta$ term, this is selected to track long term drift in the remote clock frequency but reject short term variation due to packet delay variations.

A PDV Depth Control Algorithm (26) makes relatively infrequent adjustments to the PDV Buffer (12) (by adding or removing packets to or from the buffer) which may be based on:

Filtered Depth reading of queue depth provided by filter (28), which may be of the type described by Equation (2)

Underrun events (indicating the Queue (14) is too small)

Maximum and Minimum Depth readings

Network Delay Measurements (For example obtained by network "ping" utility)

The Minimum & Maximum depth values are reset to the current Queue Depth each time they are read by the PDV Buffer Depth Control Algorithm (26), and are then adjusted whenever the Packet Queue Depth is altered.

Alternative Filter algorithms may be used.

Alternative Clock Control Algorithms may be used e.g. $2^{nd}$ and higher order, fuzzy logic, neural networks, and selftuning algorithms that vary parameters such as the time constant or Clock Control Interval over time.

An Internal or External CPU May be Used for the Clock Control & Depth Control Algorithms Fractions of a bit, byte, frame or packet counts may be used as the Timestamp units instead of bits.

The method as described makes use of all the data packets. It is also possible to use a subset of the packets, or to use special timing packets.

It would be possible to implement the method without remote timestamps where packets are of a consistent payload size, provided a sequence number is available in the packets transmitted from the source to the destination. The remote timestamp can be reconstructed at the destination by multiplying the sequence number by the size of the TDM payload. As mentioned above, the size may be expressed in fractions of a bit, bits, bytes, frames or packets. The use of a sequence number applied by the source device ensures that the timestamp calculation is not corrupted by lost or out-of-sequence packets.

The method has application in timing recovery over packet based systems or other asynchronous systems. A typical application of the method described above is in emulation of TDM (time division multiplexed) circuits across a packet network, such as Ethernet, ATM or IP. Circuit emulation may be used to support the provision of leased line services to customers using legacy TDM equipment. For example, FIG. 1 shows a leased line TDM service being carried across a packet network. The advantages are that a carrier can upgrade to a packet switched network, whilst still maintaining their existing TDM business.

The clock recovery method described above provides the following advantages:

1. The method is able to make use of all of the incoming data packets at the destination device to converge average $f_{regen}$ (i.e. local clock) to average $f_{service}$ (i.e. remote clock).
2. No expensive Clock Generation Circuits are required (such as oven controlled crystal oscillators).
3. Timestamps contained in the incoming packets are compared to a Local Timestamp value to obtain a Transit Time value.
4. The sequence of Transit Time values that is obtained are filtered.
5. The filtered Transit Time value is used by a Clock Control Algorithm to adjust the Local TDM Clock of the device.
6. The separation of the filter from the Clock Recovery Algorithm allows the Clock Control Algorithm to operate at a much slower rate than the filter. So that, for example, a high speed filter could be implemented in Hardware and a low speed Clock Control Algorithm with an external CPU. This confers significant benefits, such as flexibility, reduction of development risk, ease of optimising the solution for a specific environment etc.
7. A method is provided to enable the Local Timestamp to be initialised to the value of the first received Remote Timestamp to minimise wraparound problems and prevent a start up error with the recovered clock.
8. A method is provided to allow packets to be deleted from the PDV Buffer and dummy packets to be inserted into the PDV Buffer in order to adjust the device latency. This does not affect the Local Timestamp value mentioned above.
9. The PDV Buffer Depth is filtered at an appropriate interval.
10. Minimum & Maximum PDV Buffer Depth values are maintained
11. The filtered PDV Buffer Depth, and Minimum & Maximum PDV Buffer Depth values may be used by a Buffer Depth Control Algorithm which may run at a much slower rate than the rate at which the filter is updating.
12. The clock recovery method described here allows the PDV Buffer depth to be varied independently of the clock recovery mechanism. This allows the clock recovery to stabilise prior to setting up the PDV Buffer, and allows the buffer to be changed during operation to match any underlying shift in network characteristics.

It is also possible to exclude late packets from the Transit Time calculations, which may improve performance. Such packets may artificially increase the Transit Time, causing the recovered clock to appear as though it is running too fast.

What is claimed is:

1. A method of recovering a clock signal for a TDM output from packets of TDM data which have been transmitted over a packet network, from a source having a source TDM clock to a destination having a destination TDM clock, the method comprising:

providing at least some packets with a Remote Timestamp, or information from which a Remote Timestamp can be generated based solely on a bit count determined by counting periods of the source TDM network, and wherein the Remote Timestamp represents the state of the source TDM clock when the packet is created;

providing said at least some packets with a Local Timestamp based solely on a bit count determined by counting period of the destination TDM network representing the state of the destination TDM clock when the packet is received;

determining a Transit Time value representing the difference between said Local and Remote Timestamps;

filtering the Transit Time value over times to produce a filtered Transit Time; and controlling the clock frequency of the TDM output only on the basis of said filtered Transit Time as determined above and independently from the depth of a packet buffer, wherein any transit time greater than a pre-determined value is excluded as an input to any control algorithm for adjusting the clock frequency of said TDM output.

2. A method as claimed in claim 1, wherein a filter is provided to filter said Transit Time value over time.

3. A method as claimed in claim 2, wherein said filter is a first order low pass filter.

4. A method as claimed in claim 1, wherein the received packets are placed in the packet buffer, and the buffer depth is controlled by a depth control algorithm.

5. A method as claimed in claim 4, wherein said depth control algorithm makes adjustments to said packet buffer by adding or removing packets.

6. A method as claimed in claim 1, wherein said Remote Timestamp is calculated at said destination by counting the number of packet payload bits which have been received.

7. A method as claimed in claim 1, wherein a sequence number is allocated sequentially to each packet, and wherein said Remote Timestamp is calculated at said destination by multiplying the packet payload size by the packet sequence number.

8. A method as claimed in claim 1, wherein said clock frequency is controlled by a clock control algorithm which ensures that the change in said clock frequency is proportional to the change in the average transit time.

9. A method as claimed in claim 8, wherein said clock control algorithm is given by:

$$F(m)F(m-1)+\beta(\Delta\Phi_{av}(m)/\Delta t)$$

Where:

$F(m)_{is}$, the Frequency to be written to the DCO;

F(m−1) is the Current DCO Frequency;

β is a constant that determines a time constant;

$\Delta\Phi_{av}(m)$ is the change in the average transit time;

m is the sample number that increments each time the Clock Control Algorithm reads the value of $\Delta\Phi_{av}$; and Δt is the time interval between reads of values by the Clock Control Algorithm.

10. A method as claimed in claim 8, wherein said clock control algorithm also incorporates phase locking between the source and destination TDM clocks.

11. A method as claimed in claim 10, wherein said clock control algorithm is given by:

$$F(m)F(m-1)+\beta(\Delta\Phi_{av}(m)/\Delta t)+\gamma((\Phi_{av}(m)K)/\Delta t)$$

Where:

$F(m)_{is}$, the Frequency to be written to the DCO;

F(m−1) is the Current DCO Frequency;

$\Delta\Phi_{av}(m)$ is the change in the average transit time;

m is the sample number that increments each time the Clock Control Algorithm reads the value of $\Delta\Phi_{av}$;

β and γ are constants that determine time constants of the algorithm;

K is a constant that provides a "centre value" for the filtered transit time, $\Phi_{av}$ (m); and Δt is the time interval between reads of values by the Clock Control Algorithm.

12. A clock recovery system for recovering a clock signal for a TDM output from packets of TDM data which have been transmitted over a packet network, from a source having a source TDM clock to a destination having a destination TDM clock, the system comprising:

remote timestamp extraction means for extracting a Remote Timestamp value from received packets, the Remote Timestamp being based solely on a bit count determined by counting periods of the source TDM network, and representing the state of the source TDM clock when the packet is created;

local timestamp means for providing received packets with a Local Timestamp based solely on a bit count determined by counting periods of the destination TDM network representing the state of the destination TDM clock when the packet is received;

a differencer for determining a Transit Time representing the difference between said Local and Remote Timestamps;

a filter for filtering the output of said differencer to produce a filtered Transit Time; and clock control means arranged to control the frequency of the TDM output only on the basis of said filtered Transit Time independently from the depth of a packet buffer, wherein said clock control means ignores any Transit Time greater than a predetermined value.

13. A clock recovery system as claimed in claim 12, wherein said filter is a first order low pass filter.

14. A clock recovery system as claimed in claim 12, which further comprises the packet buffer for holding received packets, and a depth control arrangement for controlling the depth of the packet buffer.

15. A clock recovery system as claimed in claim 14, wherein said depth control arrangement is arranged to make adjustments to said packet buffer by adding or removing packets.

16. A clock recovery system as claimed in claim 12, wherein said remote timestamp extraction means calculates said Remote Timestamp by counting the number of packet payload bits which have been received.

17. A clock recovery system as claimed in claim 12, wherein a sequence number is allocated sequentially to each packet, and wherein said Remote Timestamp is calculated at said destination by multiplying the packet payload size by the packet sequence number.

* * * * *